US008818106B2

(12) United States Patent
Chertok et al.

(10) Patent No.: US 8,818,106 B2
(45) Date of Patent: Aug. 26, 2014

(54) METHOD FOR ORGANIZING A DATABASE OF IMAGES AND RETRIEVING IMAGES FROM THAT DATABASE ACCORDING TO A QUERY IMAGE

(75) Inventors: Michael Chertok, Tel Aviv (IL); Adi Pinhas, Hod Hasharon (IL)

(73) Assignee: Superfish Ltd., Givat Shmuel (IL)

(*) Notice: Subject to any disclaimer, the term of this patent is extended or adjusted under 35 U.S.C. 154(b) by 1079 days.

(21) Appl. No.: 12/775,260

(22) Filed: May 6, 2010

(65) Prior Publication Data

US 2010/0284620 A1    Nov. 11, 2010

Related U.S. Application Data

(60) Provisional application No. 61/175,915, filed on May 6, 2009.

(51) Int. Cl.
*G06K 9/68* (2006.01)
*G06K 9/00* (2006.01)
*G06F 17/30* (2006.01)

(52) U.S. Cl.
CPC ................. *G06F 17/30259* (2013.01)
USPC ............. 382/218; 382/128; 382/131

(58) Field of Classification Search
None
See application file for complete search history.

(56) References Cited

FOREIGN PATENT DOCUMENTS

WO    WO 2008/0142675    11/2008

OTHER PUBLICATIONS

Leordeanu et al. "A Spectral Technique for Correspondence Problems Using Pairwise Constraints." IEEE on Computer Vision. 2005. pp. 1-8.*
Polak et al. "Latent Model Clustering and Applications to Visual Recognition." IEEE. 2007. pp. 1-8.*

* cited by examiner

*Primary Examiner* — Thomas Conway
(74) *Attorney, Agent, or Firm* — Merchant & Gould P.C.

(57) ABSTRACT

A method for determining a matching score between a first set of $n_1$ feature points, and a second set of $n_2$ feature points includes producing a triple-wise affinity tensor, determining a leading eigenvector of the triple-wise affinity tensor, iteratively producing a binary optimal assignment vector and determining a matching score between the first set of feature points and the second set of feature points. The triple-wise affinity tensor includes the affinity score of assignments of triplets of feature points of the first set of feature points and triplets of feature points of the second set of feature points. The procedure of iteratively producing a binary optimal assignment vector is performed by discretization of the leading eigenvector. The procedure of determining a matching score is performed according to the triple-wise affinity tensor and according to the optimal assignment vector.

11 Claims, 5 Drawing Sheets

METHOD FOR ORGANIZING A DATABASE OF IMAGES AND RETRIEVING IMAGES FROM THAT DATABASE ACCORDING TO A QUERY IMAGE

This application claims benefit of U.S. Ser. No. 61/175,915, filed 6 May 2009 and which application is incorporated herein by reference. To the extent appropriate, a claim of priority is made to the above disclosed applications.

FIELD OF THE INVENTION

The disclosed technique relates to organizing image database, in general, and to methods for determining a similarity measure between two graphs, each representing an image, in particular.

BACKGROUND OF THE INVENTION

Methods for estimating the matching (i.e., similarity) between two graphs (e.g., representing two images) are known in the art. One of the methods for estimating the matching is by formulating the matching as an assignment problem between two sets of points, $x_1^i$, $1 \ldots N_1$ and $x_2^j$, $i= 1 \ldots N_2$. The term "affinity" as detailed herein below, refers to the similarity or correspondence between two objects. For example, the affinity of two feature points is defined by the similarity between the descriptors of the feature points. Another example is the affinity of two pairs of feature points (i.e., pair-wise affinity), which refers to the similarity between the geometric relations between the points within each pair (i.e., the difference in the distances between the points within each pair). The pair-wise affinity can further incorporate the similarities between the descriptors of the points.

The term "affinity tensor" as detailed herein below refers to a tensor including the affinity score between each of the objects of a first set of objects and each of the objects of a second set of objects. The rank of the tensor (i.e., the number of indices required for defining an entry) is determined according to the number of points of each set which are matched. For example, a pair-wise affinity tensor is a two dimensional matrix, a triple-wise affinity tensor is three dimensional, a quadruple-wise affinity tensor is four dimensional. The term "assignment" as detailed herein below, refers to an assignment of a first object of a first set of objects to a second object of a second set of objects. Each assignment is weighted according to the correspondence (e.g., affinity score) between the first object and the second object. It is noted that a set of assignments between two sets of objects can be subjected to constraints. For example a one-to-one constraint means that each object of the first set can be assigned to not more than a single object of the second set. The term "optimal assignment" as detailed herein below, refers to a set of assignments (e.g., arranged in an assignment vector), which summed value (e.g., summed affinity score) is maximal.

An article (herein below referred to as "the article") published by Marius Leordeanu and Martial Hebert, and entitled "A Spectral Technique for Correspondence Problems Using Pair-wise Constraints", describes such a method. The article describes a method for estimating a matching between two sets of points. The first step is formulating the matching as an assignment problem (i.e., trying to find the optimal assignment). The next step is defining an assignment indicator vector—Z (i.e., which an optimum thereof is the sought solution—the optimal assignment). An example of the assignment indicator vector Z is given by the following formula:

$$z = \left( \underbrace{1}_{i=1, j=1}\ 0\ 0\ \bigg|\ 0\ \underbrace{1}_{i=2, j=2}\ 0\ \bigg|\ \underbrace{1}_{i=3, j=1}\ 0\ 0 \right)^T \quad (1)$$

where $z_i^j$ is the j'th element in the i'th sub-segment of the vector Z. $z_i^j=1$, implies that $x_1^i$ corresponds to $x_2^j$ (i.e., the affinity score of $x_1^i$ and $x_2^j$ is above a predetermined value).

It is noted that the assignment indicator vector Z corresponds to an assignment which is subjected to a one-to-one constraint. Every sub-segment of the assignment vector Z contains, at most, a single element with a value of 1 and a plurality of elements with a value of 0. In case a point of $x_1^i$ matches no point of $x_2^j$, all the elements of the respective sub-segment of Z have a zero value. It is further noted that a one-to-one constraint is typical when matching points representing two physical objects since no physical point on one object can be matched (i.e., assigned or corresponded) to more than a single point on another object.

In order to estimate the assignment indicator vector Z, the next step is determining a pair-wise affinity matrix—A, such that $A_{ij}$; is the affinity of two assignments $$A_{(i+i')(j+j')} = A\left(x_1^i \to x_2^j, x_1^{i'} \to x_2^{j'}\right) \quad (2)$$

$$= \exp - \left( \frac{(|x_1^i - x_1^{i'}| - |x_1^j - x_1^{j'}|)^2}{\sigma^2} \right)$$

$$= \exp - \left( \frac{(d_{ii'} - d_{jj'})^2}{\sigma^2} \right),$$

where $\sigma$ is a predefined constant, $d_{ii'}$ is defined as a distance between $x_1^i$ and $x_1^{i'}$, while $d_{jj'}$ is a distance between $x_2^j$ and $x_2^{j'}$. Hence, $\sigma$ is a scale measure that determines the similarity of distances. The next step is maximizing the following quadratic score function:

$$z^* = \underset{z}{\mathrm{argmax}}\, z^T A z,\ z \in \{0, 1\}. \quad (3)$$

Since the solution of equation (3) is known to be np-hard, the next step is applying spectral relaxation and solving the following equation:

$$p^* = \max_{z} \mathrm{arg} \frac{p^T A p}{p^T p},\ p \in \Re. \quad (4)$$

Equation (4) is solved by the eigendecomposition of affinity matrix A. where $p^* = \phi_0$, $\phi_0$ being the eigenvector corresponding to the leading eigenvalue. $z^*$ is then recovered be a discretization of $p^*$ by the following steps as detailed herein below.

The first step is reducing the size of affinity matrix A. The affinity matrix A is of size $N_1 * N_2 \times N_1 * N_2$ since each of the points of $x_1^i$ is assigned to each of the points of $x_2^j$, and each of the assignments is matched with every assignment. Furthermore, all the entries of the primary diagonal of affinity matrix A are of value 1 as these entries represent a matching score between an assignment and itself. It is noted that, when possible, application specific information about tentative correspondences between a point of the first set $X_1$ and a point of the second set $X_2$ is employed for reducing the possible correspondences (i.e., possible assignments).

For example, in case each of the points represents a feature point of an image, the local descriptor of each feature point is employed for ruling out possible assignments in advance (i.e., prior to calculating the value of the assignments). In this manner, the number of possible assignments can vary from point to point (e.g., a first point of the first set of points is assigned to three points of the second set while a second point of the first set is assigned to seven points of the second set). However, for the sake of simplicity of discussion, the number of considered possible correspondences for each point in the set $X_1$ is K, where $K \leq N_2$. In this case the size of the affinity matrix is $(N_1*K) \times (N_1*K)$ The next step is reshaping the relaxed eigenvector p* into matrix of $N_1 \times K$, where $N_1$ is the number of points in the first set and K is the number of possible correspondent points (i.e., per point in the first set) in the second set of points (i.e., in case K is smaller than $N_2$, the matching score refers to partial matching).

The following step is choosing the maximal value of p*, and marking the corresponding entry in z*(i,j) as one. This step is repeated in iterations over p*. In order to enforce an assignment one-to-one constraint, the next step is marking other possible correspondences involving i or j as null (i.e., impossible assignment). The process continues until all of the entries of p* are marked as null. The spectral similarity measure between the sets $x_1$ and $x_2$ is given by the scalar:

$$\Psi(x_1, x_2) = z^T A z, z \in \{0,1\}. \tag{5}$$

SUMMARY OF THE PRESENT INVENTION

It is an object of the disclosed technique to provide a novel method for efficiently estimating the matching between two graphs, which overcomes the disadvantages of the prior art.

In accordance with the disclosed technique, there is thus provided a method for determining a matching score between a first set of n1 feature points, and a second set of n2 feature points. The method including the procedures of producing a triple-wise affinity tensor, determining a leading eigenvector of the triple-wise affinity tensor, iteratively producing a binary optimal assignment vector and determining a matching score between the first set of feature points and the second set of feature points. The triple-wise affinity tensor includes the affinity score of assignments of triplets of feature points of the first set of feature points and triplets of feature points of the second set of feature points. The procedure of iteratively producing a binary optimal assignment vector is performed by discretization of the leading eigenvector. The procedure of determining a matching score is performed according to the triple-wise affinity tensor and according to the optimal assignment vector.

In accordance with another embodiment of the disclosed technique, there is thus provided a method for determining a matching score between a first set of $n_1$ feature points, and a second set of $n_2$ feature points. The method including the procedures of producing a pair-wise affinity matrix, determining a leading eigenvector of the pair-wise affinity tensor, iteratively producing a binary optimal assignment vector and determining a matching score between the first set of feature points and the second set of feature points. The pair-wise affinity matrix includes the affinity score of assignments of pairs of feature points of the first set of feature points and pairs of feature points of the second set of feature points. The procedure of iteratively producing a binary optimal assignment vector is performed by discretization of the leading eigenvector. The procedure of determining a matching score is performed according to the pair-wise affinity matrix and according to the optimal assignment vector.

In accordance with a further embodiment of the disclosed technique, there is thus provided a system for sorting a database of images according to the similarity score between each of the images the system including an affinity tensor producer, a leading eigenvector determiner, an optimal assignment vector producer and a matching score determiner. The affinity tensor producer produces an affinity tensor between a selected pair of the images. The leading eigenvector determiner is coupled with the affinity tensor producer. The leading eigenvector determiner determines a leading eigenvector of the affinity tensor. The optimal assignment vector producer is coupled with the leading eigenvector determiner. The optimal assignment vector producer iteratively produces a binary optimal assignment vector by discretization of the leading eigenvector. The matching score determiner is coupled with the binary optimal assignment vector producer. The matching score determiner determines a matching score between the selected pair of images according to the affinity tensor and according to the optimal assignment vector. The sorting system sorts the images and stores them onto a database according to the similarity score between pairs of the images.

In accordance with another embodiment of the disclosed technique, there is thus provided a system for retrieving image related information, corresponding to a selected image, according to a query image. The system including a database and a matching score system. The database includes a plurality of images. The matching system includes an affinity tensor producer, a leading eigenvector determiner, a binary optimal assignment vector producer and a matching score determiner. The matching score system receives the image query and a selected image from the database, and determines the matching score between the selected image and the image query. The affinity tensor producer produces an affinity tensor between the selected image and the image query. The leading eigenvector determiner is coupled with the affinity tensor producer. The leading eigenvector determiner determines a leading eigenvector of the affinity tensor. The binary optimal assignment vector producer is coupled with the leading eigenvector determiner. The binary optimal assignment vector producer iteratively produces a binary optimal assignment vector by discretization of the leading eigenvector. The matching score determiner is coupled with the binary optimal assignment vector producer. The matching score determiner determines a matching score between the selected image and the image query according to the affinity tensor and according to the optimal assignment vector.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by producing a sparse triple-wise affinity tensor, which includes the triple-wise affinity score of each triplet of a first set of feature points (i.e., corresponding to a first image) and each triplet of a second set of feature points (i.e., corresponding to a second image). Next an estimated leading eigenvector of the triple-wise affinity tensor is determined by either eigendecomposition (i.e. power iteration method) or by marginalization of the triple-wise affinity tensor. The next step is determining a binary optimal assignment vector by iterative discretization of the estimated leading eigenvector. The final step is determining a matching score between the first image and the second image by multiplying the triple-wise affinity tensor with the optimal assignment vector on both sides thereof.

Figure 1A:
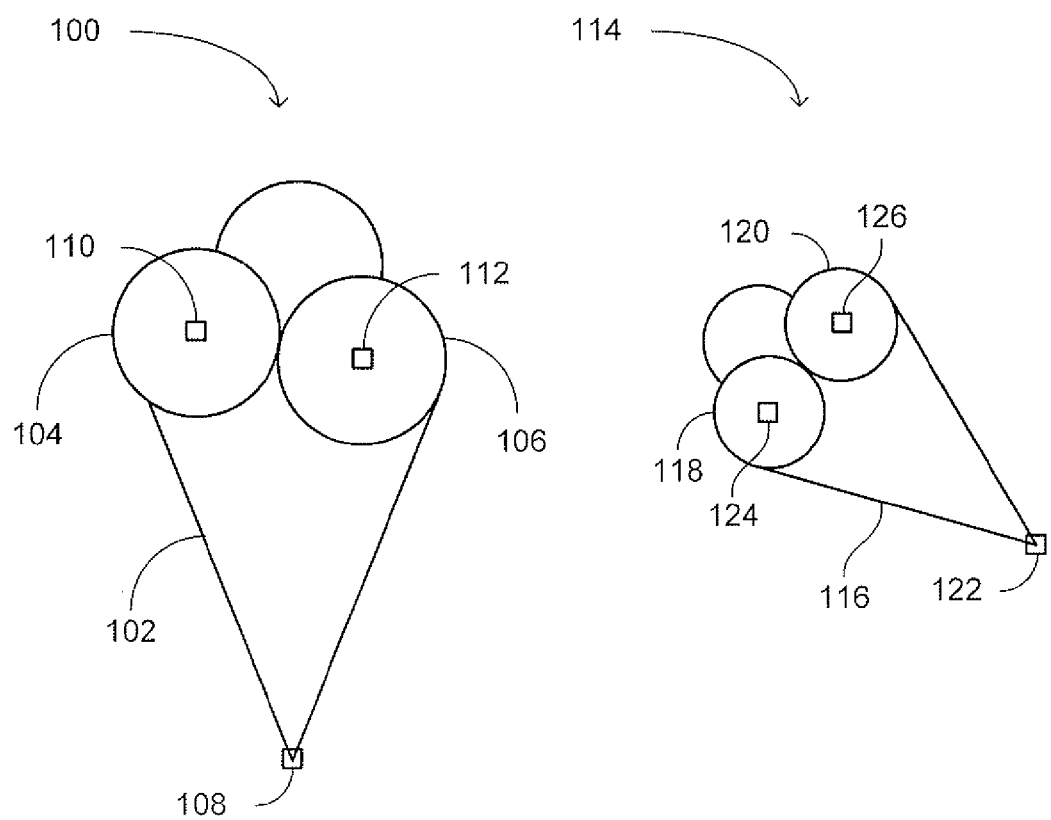
FIG. 1A is a schematic illustration of a first image and a second image, in accordance with an embodiment of the disclosed technique.
Figure 1B:
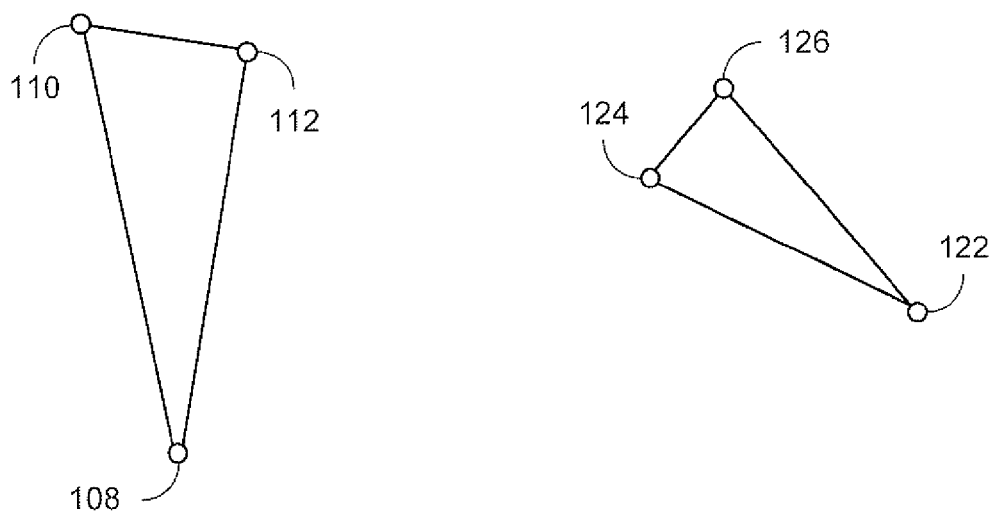
FIG. 1B is a schematic illustration of the feature points of the pair of images of FIG. 1A.

Reference is now made to FIGS. 1A and 1B. FIG. 1A is a schematic illustration of a first image and a second image, generally referenced 100 and 114 respectively, in accordance with an embodiment of the disclosed technique. FIG. 1B is a schematic illustration of the feature points of the pair of images of FIG. 1A. First image 100 includes a first ice-cream cone 102, a right ice-cream ball 104, a left ice-cream ball 106 and three feature points 108, 110 and 112. Feature point 108 corresponds to the end of cone 102. Feature point 110 corresponds to the center of right ice-cream ball 104. Feature point 112 corresponds to the center of left ice-cream ball 106. Second image 114 includes a second ice-cream cone 116, a right ice-cream ball 118, a left ice-cream ball 120 and three feature points 122, 124 and 126. Feature point 122 corresponds to the end of cone 116. Feature point 124 corresponds to the center of right ice-cream ball 118. Feature point 126 corresponds to the center of left ice-cream ball 120.

As detailed herein above, a pair-wise affinity is defined as a difference between geometric distances between the points within each pair. It is noted that both sets of points (e.g., both images) have to be of the same scale, in order to compare the distances between the points of each pair. In case the images are not of the same scale, a scale factor is required for proper comparison of the distances. The term "scale factor" as detailed herein below, refers to the relation between two different scales. For example, first image 100 is of a first scale $S_1$ (not shown) and second image 114 is of a second scale $S_2$ (not shown). For determining the pair-wise affinity between a pair of feature points 108 and 110 and a pair of feature points 122 and 124, the distance between point 108 and point 110 is multiplied by scale factor $S_1/S_2$ and is compared to the distance between point 122 and point 124.

The term "triple-wise affinity" as detailed herein below, refers to the affinity between a first triplet of points of a first set of points and a second triplet of points of a second set of points. The triple-wise affinity is determined according to the affinity of the triangles constructed from each of the triplets of points. The affinity between the triangles of points is determined according to the differences between angles. In the example set forth in FIG. 1B, feature points 108, 110 and 112 form a first triplet of points of first image 100. Feature points 122, 124 and 126 form a second triplet of points of second image 114. The angle corresponding to each of vertices 108, 110, 112, 122, 124 and 126, is defined as $\alpha_{108}$, $\alpha_{110}$, $\alpha_{112}$, $\alpha_{122}$, $\alpha_{124}$ and $\alpha_{126}$, respectively. The triple-wise affinity between the first triplet of points and the second triplet of points is determined according to the sum of absolute differences between the angles of the triangles, which are formed by each triplet of points. In other words, the triple-wise affinity is determined, at least, according to:

$$|\alpha_{108} - \alpha_{122}| + |\alpha_{110} - \alpha_{124}| + |\alpha_{112} - \alpha_{126}|. \quad (6)$$

The triple-wise affinity can further incorporate feature point descriptor similarity. It is noted that triangle similarity is scale invariant as the angles of the triangles are scale invariant.

Figure 2:
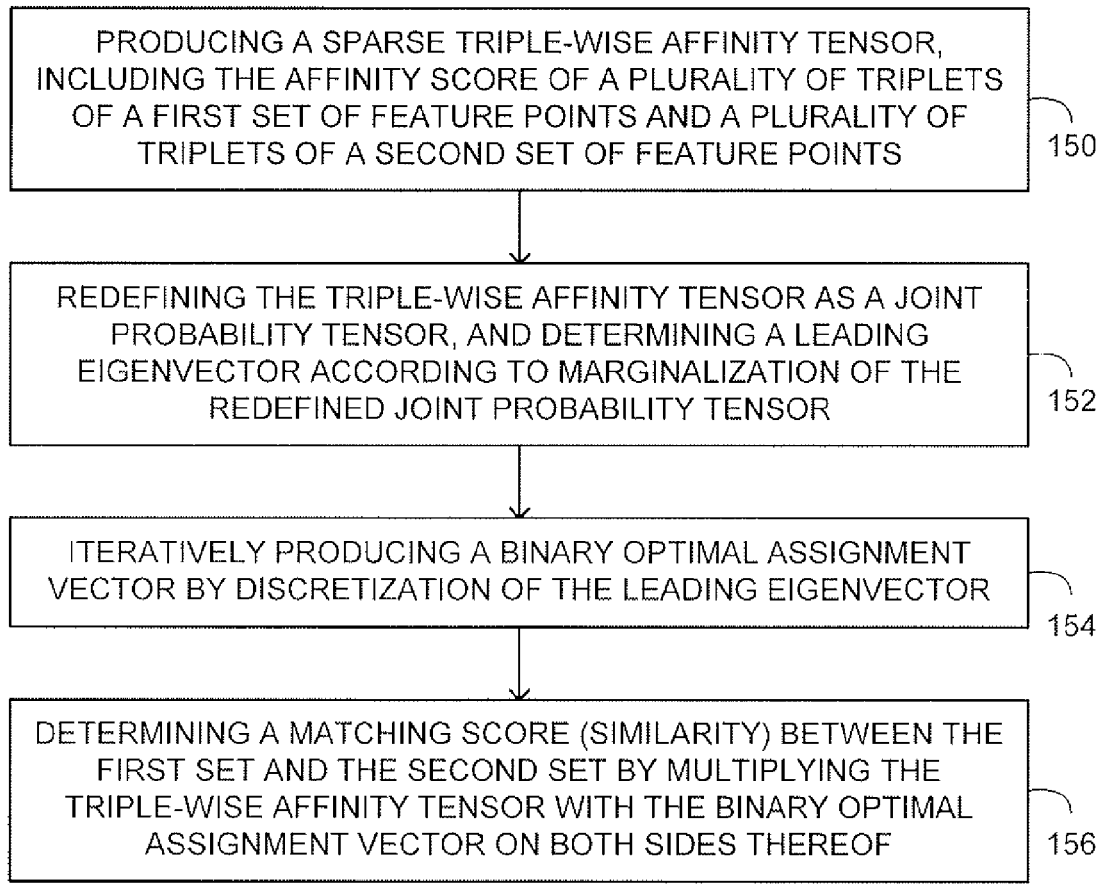
FIG. 2 is a schematic illustration of a method for determining a matching score between two sets of feature points, each of the sets of feature points corresponds to an image, operative in accordance with another embodiment of the disclosed technique.

Reference is now made to FIG. 2, which is a schematic illustration of a method for determining a matching score between two sets of feature points, each of the sets of feature points corresponds to an image, operative in accordance with another embodiment of the disclosed technique. In procedure 150, a sparse partial triple-wise affinity tensor is produced. The sparse triple-wise affinity tensor is partial since each of the points of the first set is assigned to each of possible correspondent points of the second set, instead of being assigned to each of the points of the second set (i.e., sparse complete triple-wise affinity tensor).

The possible correspondent points are determined according to application specific information. For example, in case each point corresponds to a feature point descriptor, points having similar descriptors are assigned and points having different descriptors can not be assigned. Thus, the number of potential assignments is reduced. In case there is no application specific information, the sparse triple-wise affinity tensor is not partial as each of the points of the first set is assigned to each of the points of the second set.

Figure 3:
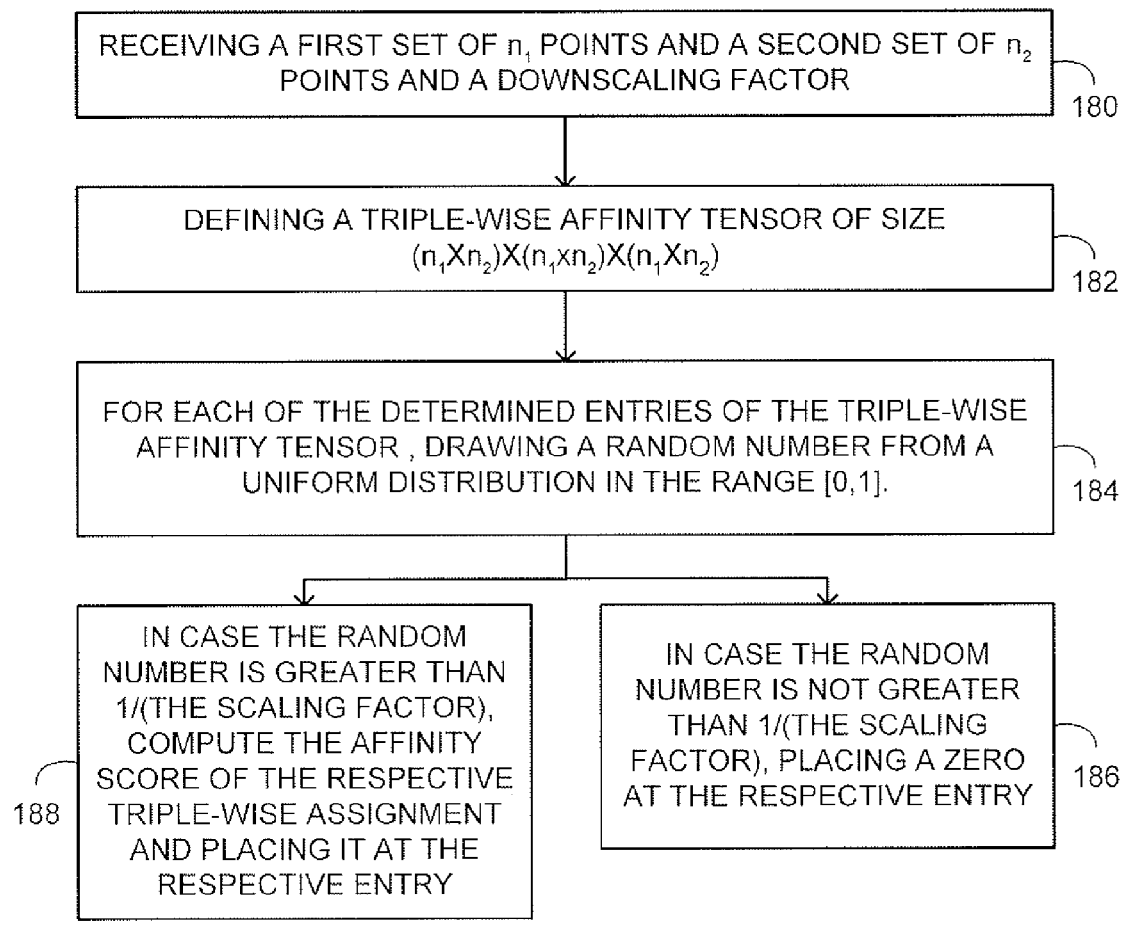
FIG. 3 is a schematic illustration of a method for producing a sparse affinity tensor, operative in accordance with a further embodiment of the disclosed technique.
Figure 5:
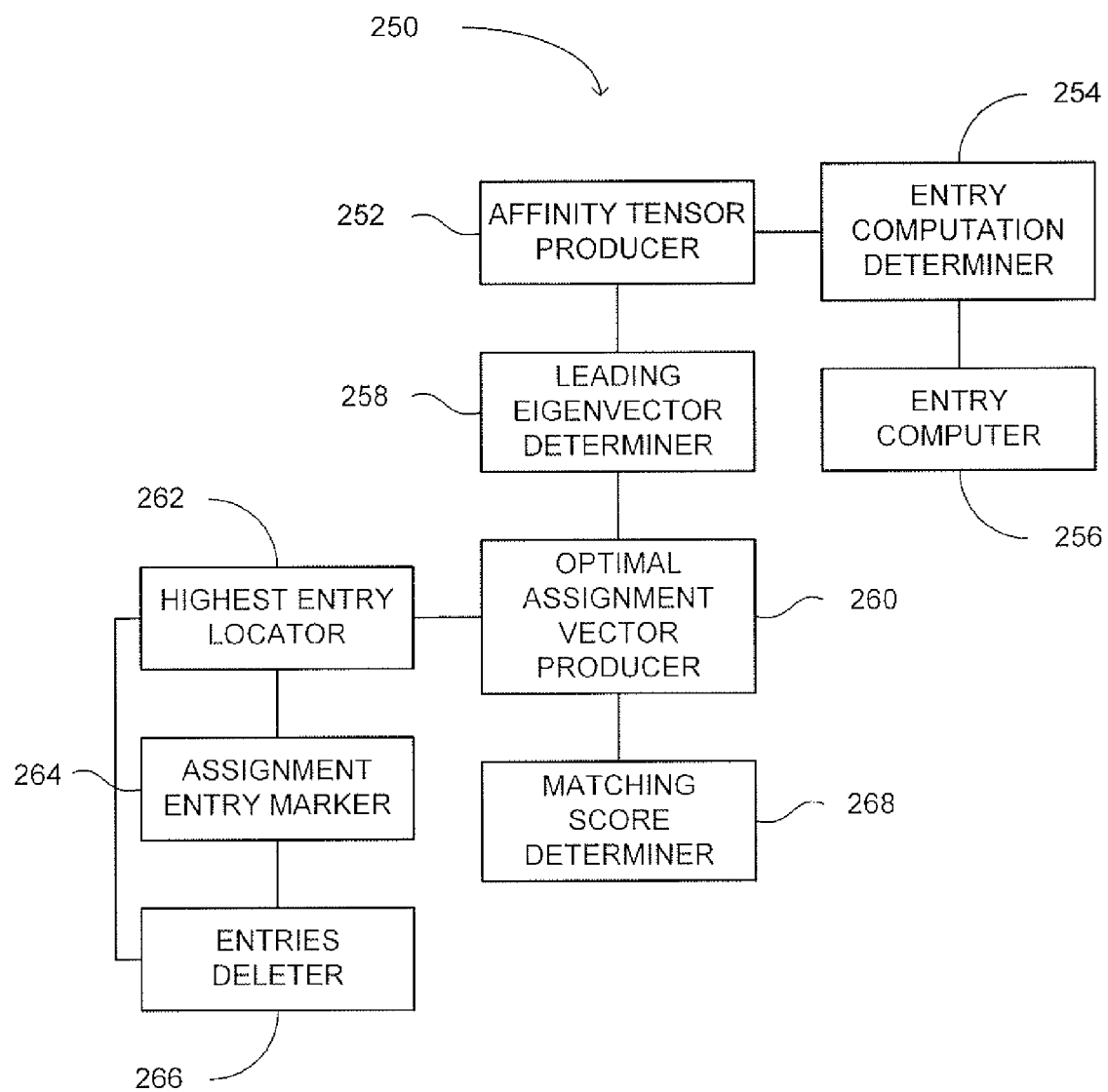
FIG. 5 is a schematic illustration of a system for sorting a database of images and for retrieving images from that database according to an image query, constructed and operative in accordance with a further embodiment of the disclosed technique.

Each entry of the sparse triple-wise affinity tensor relates to the affinity score between each triplet of a first set of feature points and each triplet of a second set of feature points, as detailed further with reference to FIG. 3. With reference to FIG. 5, affinity tensor producer 252 produces a triple-wise affinity tensor $A_{ijk}$, according to the triple-wise affinity score of a plurality of triplets from a first set of feature points $X_1^i$ and a plurality of triplets of a second set of feature points $X_2^j$.

In procedure 152, the triple-wise affinity tensor is redefined as a joint probability tensor. Each entry of the triple-wise affinity tensor is redefined as a joint probability, as in the second line of equation (7) herein below (i.e., assuming the assignment probabilities $p(x_1^i \rightarrow x_2^{i'})$, $p(x_1^j \rightarrow x_2^{j'})$ and $p(x_1^k \rightarrow x_2^{k'})$ are statistically independent). A leading eigenvector (i.e., an eigenvector corresponding to the highest valued eigenvalue) of the redefined triple-wise affinity tensor is determined according to marginalization (i.e., summing over unconditional probabilities) of each of the entries of the redefined triple-wise affinity tensor. The redefined triple-wise assignment is given by:

$$A(x_1^i \to x_2^{i'}, x_1^j \to x_2^{j'}, x_1^k \to x_2^{k'}) = P(x_1^i \to x_2^{i'}, x_1^j \to x_2^{j'}, x_1^k \to x_2^{k'}) \quad (7)$$
$$= P(x_1^i \to x_2^{i'})P(x_1^j \to x_2^{j'})P(x_1^k \to x_2^{k'})$$

The first line of equation (7) is the triple-wise affinity entry (i.e., a triple-wise assignment). The second line of equation (7) is the entry redefined as a joint probability entry. The third line of equation (7) is the marginalized joint probability triple-wise entry.

Each entry of the leading eigenvector is determined by summing over the indices, corresponding to that entry, of the redefined triple-wise affinity tensor according to the following equation:

$$p_i = \sum_k \sum_j A_{ijk} \quad (8)$$

With reference to FIG. 5, a leading eigenvector determiner 258 redefines affinity tensor $A_{ijk}$ as a joint probability tensor $A'_{ijk}$ (i.e., the redefinition is in name alone, the entries of affinity tensor $A_{ijk}$ remain unchanged). Leading eigenvector determiner 258 determines a leading eigenvector P of joint probability tensor $A'_{ijk}$ by marginalization thereof. Alternatively, leading eigenvector determiner 258 determines the leading eigenvector of triple-wise affinity tensor $A_{ijk}$ by eigendecomposition procedure (i.e. power iteration method) as known in the art.

Figure 4:
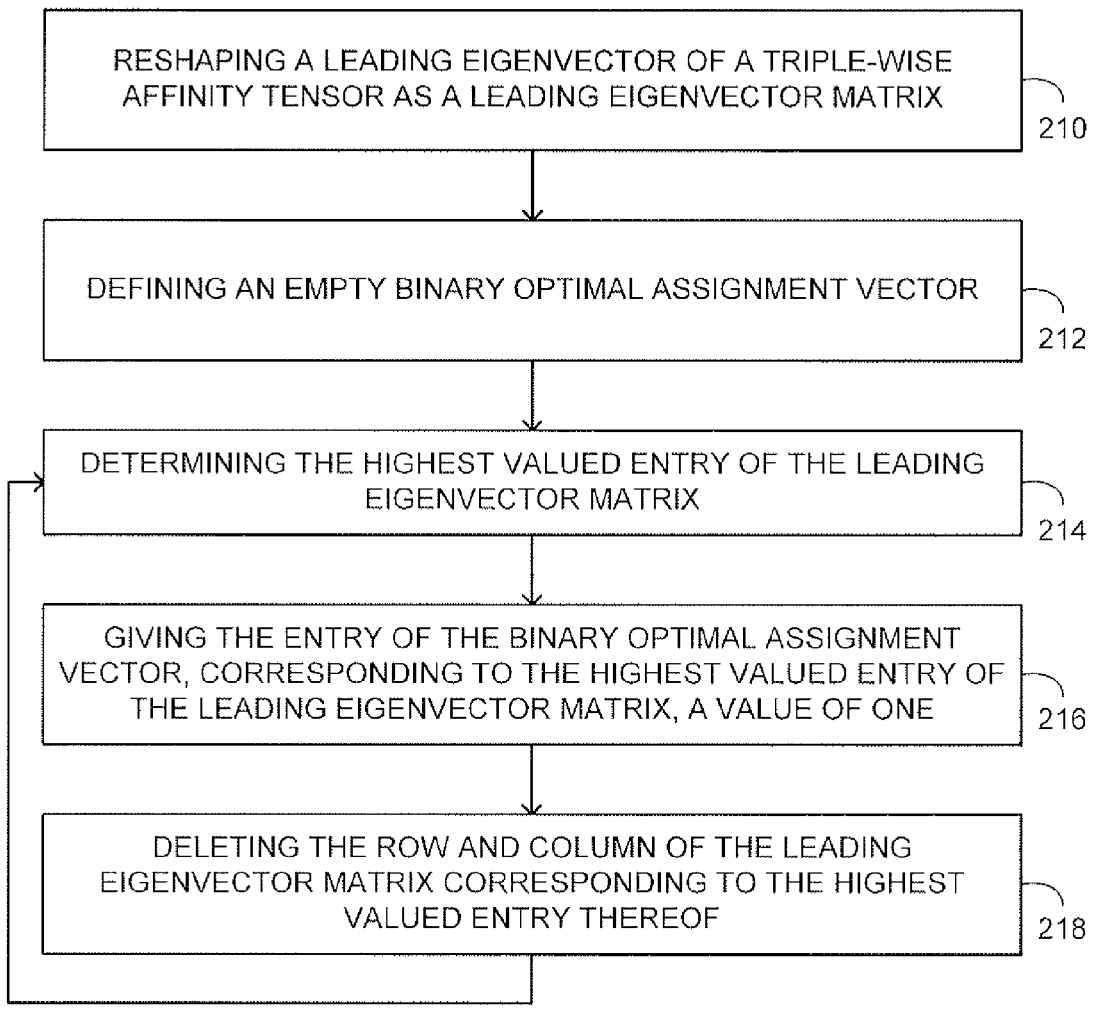
FIG. 4 is a schematic illustration of a method for iteratively producing a binary optimal assignment vector, by discretization of a leading eigenvector of a triple-wise affinity tensor, operative in accordance with another embodiment of the disclosed technique.

In procedure 154, a binary optimal assignment vector is iteratively produced by discretization of the leading eigenvector, as detailed further with reference to FIG. 4. With reference to FIG. 5, optimal assignment vector producer 260 iteratively produces an optimal assignment vector of the joint probability tensor $A'_{ijk}$.

In procedure 156, a matching score between the first image and the second image is determined by multiplying the triple-wise affinity tensor with the binary optimal assignment vector on both sides thereof. With reference to FIG. 5, matching score determiner 268 determines a matching score between the first set of feature points $X_1^i$; (e.g., a first image) and the second set of feature points $X_2^j$ (e.g., a second image) by multiplying the binary optimal assignment vector with the triple-wise affinity tensor on both sides thereof: $Z^T A_{ijk} Z$.

Reference is now made to FIG. 3, which is a schematic illustration of a method for producing a sparse affinity tensor, operative in accordance with a further embodiment of the disclosed technique. In procedure 180, a first set of $n_1$ points, a second set of $n_2$ points and a downscaling factor, are received. Each of the first set and the second set is respective of an image. The first set and the second set include the same number of points. Alternatively, the first set includes a greater number of points than the second set, or vice versa.

The downscaling factor is the factor by which the amount of resources, which are required for producing an affinity tensor, is reduced. Therefore, the downscaling factor is a real number in the range between zero and one. For example a downscaling factor of 0.5 will save half the resources required for producing the affinity tensor. In case a sparse pair-wise affinity matrix is produced (i.e., instead or beside the triple-wise affinity tensor), the scale factor between the first set of points and the second set of points is further received. In this manner the pair-wise affinity matrix can be produced (i.e., the distances between points within each set are scaled before comparison).

With reference to FIG. 5, affinity producer 252 receives a first set of $n_1$ points, a second set of $n_2$ points and a downscaling factor.

In procedure 182, a triple-wise affinity tensor of size $(n_1 \times n_2) \times (n_1 \times n_2) \times (n_1 \times n_2)$ is defined. Each entry of the triple-wise affinity tensor is respective of an affinity score between a triplet of points of the first set and a triplet of points of the second set. It is noted that, the triple-wise affinity tensor is empty at the beginning and should by filled by determining the affinity score between each of the triplets of the first set and each of the triplets of the second set.

For reducing the amount of resources, which are required for producing the triple-wise affinity tensor, only a portion of the entries thereof are determined. The entries which are not determined are filled with a value of zero (i.e., null). Most of the entries of the triple-wise affinity tensor are zeros even when fully determining the triple-wise affinity tensor. Therefore, the random determination and nullification of entries of the triple-wise affinity tensor is acceptable. In other words, the similarity score between the sets of feature points (i.e., the similarity score between the images, which correspond to the sets of feature points) as determined according to the partially determined triple-wise affinity tensor is good enough for different applications, such as image database sorting, image querying, and the like. With reference to FIG. 5, affinity tensor producer 252 produces a triple-wise affinity tensor $A_{ijk}$.

The triple-wise affinity tensor is symmetric since the similarity between two triplets of points is not dependant on the order of the points within the triplet. Every six entries of the triple-wise affinity tensor are identical $A_{ijk}=A_{kij}=A_{jki}=A_{ikj}=A_{jik}=A_{kji}$. In this manner only one in six entries has to be determined and copied into the other symmetric five entries. The one sixth determined entries of the triple-wise affinity tensor, are referred to herein below as the determined entries. Alternatively, the triple-wise affinity tensor is not symmetric and the similarity between triplets of points varies according to the order of the points within each of the triplets.

It is noted that in case of a different affinity tensor (e.g., a pair-wise affinity matrix), the number of determined entries is different (e.g., half of the entries of a pair-wise affinity matrix are determined). In procedure 184, for one sixth of the entries of the triple-wise affinity tensor (i.e., only one sixth of the entries are determined since $A_{ijk}=A_{kij}=A_{ikj}=A_{jik}=A_{kji}$, and the rest of entries are similar to the sixth determined entries), a random number from a uniform distribution in the range [0,1] is drawn (i.e., the entries for which a number is drawn are herein below referred to as the determined entries). As detailed above, the triple-wise affinity tensor is symmetric since the affinity score between two triplets of points is commutative. In case the random number is greater than 1/M (i.e., where M is the downscaling factor) procedure 188 is performed after procedure 184. Otherwise, procedure 186 is performed after procedure 184. With reference to FIG. 5, entry computation determiner 264 draws a random number for each of the determined entries of triple-wise affinity tensor $A_{ijk}$.

In procedure 186, in case the random number is not greater than 1/M (i.e., the scaling factor), a zero is placed at the respective entry. With reference to FIG. 5, entry computation determiner 254 determines for each of the determined entries of triple-wise affinity tensor $A_{ijk}$ whether the random drawn number is greater than 1/M. In case the random number drawn for a specific determined entry is not greater than 1/M, affinity tensor producer 252 places a zero in the respective determined entry.

In procedure 188, in case the random number is greater than 1/M (the scaling factor), the affinity score of the respective triple-wise assignment is computed and placed at the respective determined entry. With reference to FIG. 5, entry computation determiner 254 determines for each of the determined entries of triple-wise affinity tensor $A_{ijk}$ whether the random drawn number is greater than 1/M. In case the random number drawn for a specific determined entry is greater than 1/M, entry computer 256 computes the triple-wise affinity score respective of the specific determined entry. The affinity score is given by the following equation:

$$A_{ijk} = A_{ikj} = A_{jik} = A_{jki} = A_{kij} = A_{kji} \quad (9)$$

$$= \exp - \left( \frac{(|\alpha_1^i - \alpha_2^{i\prime}| + |\alpha_1^j - \alpha_2^{j\prime}| + |\alpha_1^k - \alpha_2^{k\prime}|)^2}{\sigma^2} \right)$$

By convolving a Gaussian kernel (i.e., the exponent in equation (9)) with the sum of absolute differences between angles, the triangle affinity is determined. The Gaussian kernel transforms the sum of absolute differences between angles into an affinity score and disconnects different points. The bandwidth (i.e., σ) of the Gaussian kernel is $$\sigma \approx \frac{\pi}{15}.$$

Alternatively, the bandwidth is any number in the range between π and $$\frac{\pi}{15}.$$

It is noted that for a downscaling factor of zero, each of the determined entries is determined according to equation (9), as detailed herein above.

Reference is now made to FIG. 4, which is a schematic illustration of a method for iteratively producing a binary optimal assignment vector, by discretization of a leading eigenvector of a triple-wise affinity tensor, operative in accordance with another embodiment of the disclosed technique. In procedure 210, a leading eigenvector of a triple-wise affinity tensor is reshaped as a leading eigenvector matrix. The eigenvector of a triple-wise affinity tensor of $(n_1 \times n_2) \times (n_1 \times n_2) \times (n_1 \times n_2)$ includes $(n_1 \times n_2)$ entries. The eigenvector is reshaped as an $(n_1 \times n_2)$ eigenvector matrix. With reference to FIG. 5, optimal assignment vector producer 260 reshapes leading eigenvector P into an eigenvector matrix $P_m$ of $(n_1 \times n_2)$. Note that eigenvector matrix $P_m$ corresponds to the linear assignment problem between first set of feature points $X_1^i$ and second set of feature points $X_2^j$. In other words, each entry of eigenvector matrix $P_m$ corresponds to an affinity score between a point of the first set of feature points $X_1^i$ (i.e., which contains $n_1$ points) and a points of the second set of feature points $X_2^j$ (i.e., which contains $n_2$ points).

In procedure 212, an empty binary optimal assignment vector is defined. With reference to FIG. 5, optimal assignment vector producer 260 defines an empty binary optimal assignment vector Z. In procedure 214, the highest valued entry of the leading eigenvector matrix is determined. With reference to FIG. 5, highest entry locator 262 locates the highest valued entry of leading eigenvector matrix $P_m$.

In procedure 216, the entry of the binary optimal assignment vector, corresponding to the highest valued entry of the leading eigenvector matrix, is given a value of one. With reference to FIG. 5, assignment entry marker 264 gives a value of one to the entry of binary optimal assignment vector Z, corresponding to the highest valued entry of eigenvector matrix $P_m$.

In procedure 218, the row and column, corresponding to the highest valued entry of the of the eigenvector matrix, are deleted. It is noted that the highest valued entry itself is deleted as well. Procedures 164, 166 and 168, are repeated until the eigenvector matrix is empty. With reference to FIG. 5, entries deleter 266 deletes the row and column corresponding to the highest valued entry of the of the eigenvector matrix $P_m$. Entries deleter 266 returns the eigenvector matrix $P_m$ to highest entry locator 262. Highest entry locator 262, assignment entry marker 264 and entries deleter 266 repeat performing procedures 164 to 168 of FIG. 4 (i.e., repeat the discretization of leading eigenvector matrix $P_m$) until matrix $P_m$ is empty. Optimal assignment vector producer 260 gives a value of zero to all entries of binary optimal assignment vector Z, which were not given any value.

As mentioned above, eigenvector matrix $P_m$ corresponds to the linear assignment problem between first set of feature points $X_1^i$ and second set of feature points $X_2^j$. Therefore and alternatively, procedures 162 to 168 of FIG. 4 can be replaced by performing the Hungarian algorithm on matrix $P_m$ for determining a binary optimal assignment vector Z.

Reference is now made to FIG. 5, which is a schematic illustration of a system, generally referenced 250, for sorting a database of images and for retrieving images from that database according to an image query, constructed and operative in accordance with a further embodiment of the disclosed technique. System 250 includes an affinity tensor producer 252, an entry computation determiner 254, an entry computer 256, a leading eigenvector determiner 258, an optimal assignment vector producer 260, a highest entry locator 262, an assignment entry marker 264, an entries deleter 266, and a matching score determiner 268. Affinity tensor producer 252 is coupled between entry computation determiner 254 and leading eigenvector determiner 258. Entry computation determiner 254 is further coupled with entry computer 256. Optimal assignment vector producer 260 is coupled between leading eigenvector determiner 258, highest entry locator 262 and matching score determiner 268. Highest entry locator 262 is further coupled with assignment entry marker 264 and with entries deleter 266.

Affinity tensor producer 252 receives a first set of feature points $X_1^i$ (i.e., a first image, such as first image 100 of FIG. 1) including $n_1$ points and a second set of feature points $X_2^j$ (i.e., a second image, such as second image 114 of FIG. 1) including $n_2$ feature points. Affinity tensor producer 252 further receives a downscaling factor M. In case system 252 determines the similarity score between images according to a pair-wise affinity matrix affinity tensor producer 252 receives the scale of each image. Affinity tensor producer 252 produces a triple-wise affinity tensor $A_{ijk}$ of $(n_1 \times n_2) \times (n_1 \times n_2) \times n_1 \times n_2$. Affinity tensor producer 252 determines the percentage of entries of tensor $A_{ijk}$ which are determined, according to downscaling factor M, by employing entry computation determiner 254. Downscaling factor M is determined according to the sparsity of the corresponding affinity tensor. The downscaling factor is selected such that it reduces the computation resources without sacrificing performance.

Entry computation determiner 254 draws a random real number (not shown), in the range between zero and one, for each of the determined entries of tensor $A_{ijk}$ (i.e., since $A_{ijk}=A_{kij}=A_{jki}$). Entry computation determiner 254 compares between the random number, respective of each determined entry, and 1/M. In case the random number is greater, entry computer 256 computes the affinity score of the respective determined entry according to equation (9) as detailed herein above, and affinity tensor producer 252 places the affinity score in its respective determined entry. Otherwise affinity tensor producer 252 places zero in the respective determined entry. Once tensor $A_{ijk}$ is completely filled, Affinity tensor producer 252 provides tensor $A_{ijk}$ to leading eigenvector determiner 258.

Leading eigenvector determiner 258 receives tensor $A_{ijk}$ from affinity tensor producer 252. Leading eigenvector determiner 258 redefines tensor $A_{ijk}$ as a joint probability tensor $A'_{ijk}$ (i.e., assuming the assignment probabilities $p(x_1^i \to x_2^{i'})$, $p(x_1^j \to x_2^{j'})$ and $p(x_1^k \to x_2^{k'})$ are statistically independent). Leading eigenvector determiner 258 redefines tensor $A_{ijk}$ according to equation (7), as detailed herein above (i.e., the redefinition is only by name, the entries of $A_{ijk}$ remain unchanged). Leading eigenvector determiner 258 produces an estimated leading eigenvector P of joint probability tensor $A'_{ijk}$. Leading eigenvector determiner 258 determines each entry of leading eigenvector $P_k$ according to equation (8), as detailed herein above.

Optimal assignment vector producer 260 reshapes leading eigenvector P into a eigenvector matrix $P_m$ of $(n_1 \times n_2)$. Optimal assignment vector producer 260 produces a binary optimal assignment vector Z of $(n_1 \times n_2)$ entries. Highest entry locator 262 locates the highest valued entry of eigenvector matrix $P_m$. Assignment entry marker 264 gives a value of one to the entry of binary optimal assignment vector Z, which corresponds to the located highest valued entry of eigenvector matrix $P_m$. Entries deleter 266 deletes the row and column corresponding to the highest valued entry of eigenvector matrix $P_m$, including the highest valued entry itself. The corresponding row and column are deleted to enforce a one-to-one constraint on the assignment of a feature point of first set $X_1^i$ to feature points of second set $X_2^j$. Each of highest entry locator 262, assignment entry marker 264 and entries deleter 266 repeats the above respective operations until eigenvector matrix $P_m$ is empty. Optimal assignment vector producer 260 gives a value of one the entries of vector Z which are unfilled.

Optimal assignment vector producer 260 provides vector Z to matching score determiner 268. Matching score determiner 268 determines a matching score between first set $X_1^i$ and second set $X_2^j$ by multiplying vector Z with affinity triple-wise tensor $A_{ijk}$ on both sides thereof, matching score=$Z^T A_{ijk} Z$.

As detailed herein above, system 250 determines a matching score (i.e., similarity) between two sets of points (i.e., two images) for various applications. For example, system 250 sorts images within a database (not shown) according to different consumer products categories, such as car images, electrical appliance images (e.g., sub sorted into kitchen electrical appliances and garden electrical appliances) and jewelry images (e.g., sub sorted into ring images, necklace images and earrings images). When system 250 receives a new image (not shown), system 250 determines the similarity score between the new image and each of the images of the database and stores the new image next to the most similar image. Alternatively, processor 250 can provide a user with a few images of the database, having the highest matching score with the new image.

In another example, system 252 provides image related information (e.g., price of a product, owners manual, and the like), corresponding to images stored on the database, according to an image query (the new image). The user provides the image query to system 252. System 252 determines which of the images stored on the database has the highest matching score with the query image. System 252 provides the user with information relating to the determined highest matching score image.

As detailed herein above, the term "affinity" refers to similarity or correspondence between two objects. The disclosed technique determines the similarity between two sets of points according to either the pair-wise affinity tensor or the triple-wise affinity tensor between the two sets. The example set forth in FIGS. 2, 3, 4 and 5, relates to triple-wise affinity. It is noted that the similarity between two sets of points can further be determined according to pair-wise similarity in a substantially similar manner. The similarity determination according to pair-wise affinity is performed under the following amendments, the pair-wise affinity tensor is a second rank tensor (i.e., a matrix) and a scale factor is required for determining a pair-wise affinity of two pairs of points, each of a different set of points.

It will be appreciated by persons skilled in the art that the disclosed technique is not limited to what has been particularly shown and described hereinabove. Rather the scope of the disclosed technique is defined only by the claims, which follow.

The invention claimed is:

1. A method for determining a matching score between a first set of $n_1$ feature points, and a second set of $n_2$ feature points, the method comprising the procedures of:
producing a triple-wise affinity tensor, including the affinity score of assignments of triplets of feature points of said first set of feature points and triplets of feature points of said second set of feature points, wherein said affinity score of assignments of triplets is determined by the equation:

$$A_{ijk} = A_{ikj} = A_{jik} = A_{jki} = A_{kij} = A_{kji}$$
$$= \exp - \left( \frac{\left( |\alpha_1^i - \alpha_2^{i'}| + |\alpha_1^j - \alpha_2^{j'}| + |\alpha_1^k - \alpha_2^{k'}| \right)^2}{\sigma^2} \right);$$

determining a leading eigenvector of said triple-wise affinity tensor;
iteratively producing a binary optimal assignment vector by discretization of said leading eigenvector; and
determining a matching score between said first set of feature points and said second set of feature points according to said triple-wise affinity tensor and according to said optimal assignment vector
wherein said procedures of producing a triple-wise affinity tensor, determining a leading eigenvector, producing a binary optimal assignment vector and determining a matching score are being performed by a computer system including at least one processor.

2. The method according to claim 1, wherein said triple-wise affinity tensor is complete, such that each of the feature points of said first set of feature points is assigned to each of the feature points of said second set of feature points.

3. The method according to claim 1, wherein said procedure of producing a triple-wise affinity tensor further includes the sub-procedures of:
receiving said first set of $n_1$ feature points, said second set of $n_2$ feature points and a downscaling factor;
defining an empty triple-wise affinity tensor of size $(n_1 * n_1) \times (n_1 * n_1) \times (n_1 * n_1)$;

for each entry of a first portion of entries of said empty triple-wise affinity tensor, determining the triple-wise affinity score, corresponding to said first portion entry, and inputting said corresponding triple-wise affinity score into said first portion entry, wherein the size of said first portion of entries is predetermined according to said downscaling factor;

for each of a second portion of entries of said empty triple-wise affinity tensor, inputting a zero into said second portion entry, said second portion of entries is predetermined according to said downscaling factor.

4. The method according to claim 1, wherein said procedure of determining a leading eigenvector of said triple-wise affinity tensor is performed by eigendecomposition of said triple-wise affinity tensor.

5. The method according to claim 1, wherein said procedure of determining a leading eigenvector of said triple-wise affinity tensor further includes the sub-procedures of:
redefining said triple-wise affinity tensor as a joint probability tensor;
determining each entry of said leading eigenvector by summing over the indices, corresponding to said leading eigenvector entry, of said redefined triple-wise affinity tensor according to the following equation:

$$p_i = \sum_k \sum_j A_{ijk}.$$

6. The method according to claim 1, wherein said triple-wise affinity tensor is partial, such that each of the feature points of said first set of feature points is assigned to possible correspondent feature points of said second set of feature points.

7. The method according to claim 6, wherein said possible correspondent feature points are determined according to a descriptor of a selected feature point of said first set of feature points and a descriptor of each of said possible correspondent feature points of said second set of feature points, such that said descriptor of said selected feature point of said first set of feature points being similar to each of said descriptors of said possible correspondent feature points of said second set of feature points.

8. The method according to claim 1, wherein said procedure of iteratively producing said binary optimal assignment vector includes the sub-procedures of:
reshaping said leading eigenvector of said triple-wise affinity tensor as a leading eigenvector matrix;
defining an empty binary optimal assignment vector;
determining the highest valued entry of said leading eigenvector matrix;
inputting in the entry of said binary optimal assignment vector, corresponding to said highest valued entry of said leading eigenvector matrix, a value of one;
deleting the row and the column of said leading eigenvector matrix, corresponding to said highest valued entry of said leading eigenvector matrix;
repeating said sub-procedures of determining the highest valued entry of said leading eigenvector matrix, inputting in the entry of said binary optimal assignment vector, and deleting the row and the column of said leading eigenvector matrix, until said leading eigenvector matrix is empty;
inputting a value of zero in each empty entry of said binary optimal assignment vector.

9. The method according to claim 8, wherein said procedures of defining an empty binary optimal assignment vector, determining the highest valued entry of said leading eigenvector matrix, inputting in the entry of said binary optimal assignment vector, deleting the row and the column of said leading eigenvector matrix, repeating said sub procedures, and inputting a value of zero are replaced by performing the Hungarian algorithm on said leading eigenvector matrix for determining an optimal assignment vector.

10. A system for sorting a database of images according to the similarity score between each of the images, the system comprising:
an affinity tensor producer for producing an affinity tensor between a selected pair of said images, wherein said affinity tensor including an affinity score of assignments of triplets of feature points of a first set of feature points and triplets of feature points of a second set of feature points, wherein said affinity score of assignments of triplets is determined by the formula:

$$A_{ijk} = A_{ikj} =$$
$$A_{jik} = A_{jki} = A_{kij} = A_{kji} = \exp-\left(\frac{(|\alpha_1^i - \alpha_2^{i'}| + |\alpha_1^j - \alpha_2^{j'}| + |\alpha_1^k - \alpha_2^{k'}|)^2}{\sigma^2}\right);$$

a leading eigenvector determiner, coupled with said affinity tensor producer, for determining a leading eigenvector of said affinity tensor;
an optimal assignment vector producer, coupled with said leading eigenvector determiner, for iteratively producing a binary optimal assignment vector by discretization of said leading eigenvector; and
a matching score determiner, coupled with said binary optimal assignment vector producer, for determining a matching score between said selected pair of images according to said affinity tensor and according to said optimal assignment vector; wherein said system sorts said images and stores said images onto a database according to the similarity score between pairs of said images.

11. A system for retrieving image related information, corresponding to a selected image, according to a query image, the system comprising:
a database, including a plurality of images; and
a matching score system receiving said image query and a selected image from said database, and determining the matching score between said selected image and said image query, said matching score system including:
an affinity tensor producer for producing an affinity tensor between said selected image and said image query, said affinity tensor including an affinity score of assignments of triplets of feature points of a first set of feature points and triplets of feature points of a second set of feature points, wherein said affinity score of assignments of triplets is determined by the formula:

$$A_{ijk} = A_{ikj} =$$
$$A_{jik} = A_{jki} = A_{kij} = A_{kji} = \exp-\left(\frac{(|\alpha_1^i - \alpha_2^{i'}| + |\alpha_1^j - \alpha_2^{j'}| + |\alpha_1^k - \alpha_2^{k'}|)^2}{\sigma^2}\right);$$

a leading eigenvector determiner, coupled with said affinity tensor producer, for determining a leading eigenvector of said affinity tensor;

a binary optimal assignment vector producer, coupled with said leading eigenvector determiner, for iteratively producing a binary optimal assignment vector by discretization of said leading eigenvector; and a matching score determiner, coupled with said binary optimal assignment vector producer, for determining a matching score between said selected image and said image query according to said affinity tensor and according to said optimal assignment vector.

* * * * *